United States Patent [19]

Raptis et al.

[11] Patent Number: 4,726,154
[45] Date of Patent: Feb. 23, 1988

[54] ANIMAL HOUSING SYSTEM

[75] Inventors: Thomas S. Raptis, Mesa; Ronald J. Johnson, Scottsdale, both of Ariz.

[73] Assignee: Port-A-Stall, Mesa, Ariz.

[21] Appl. No.: 803,893

[22] Filed: Dec. 2, 1985

[51] Int. Cl.⁴ .............................................. E04B 1/343
[52] U.S. Cl. ........................................ 52/64; 52/65; 52/69; 119/16
[58] Field of Search ................... 52/64, 65, 69, 67; 119/15, 16

[56] References Cited

U.S. PATENT DOCUMENTS

| | | | |
|---|---|---|---|
| 440,369 | 11/1890 | Saucerman | 52/64 |
| 1,173,689 | 2/1916 | Matre | 119/16 |
| 1,309,071 | 7/1919 | Johnson | 119/16 |
| 1,379,725 | 5/1921 | Shodron | 52/206 |
| 1,500,266 | 7/1924 | Primm, Sr. | 52/69 |
| 1,521,635 | 1/1925 | Lewis | 52/67 |
| 1,823,940 | 11/1929 | Hoegermeyer | 52/64 |
| 1,851,604 | 4/1930 | Tyler | 119/15 |
| 2,030,755 | 4/1934 | Miller | 119/15 |
| 2,145,831 | 1/1938 | Hewitt | 119/15 |
| 2,408,533 | 6/1944 | Russell | 119/15 |
| 3,235,915 | 2/1966 | Glaser | 52/64 |
| 3,685,223 | 8/1972 | Sherwood | 52/64 |
| 3,699,924 | 10/1972 | Hero | 119/16 |
| 3,723,824 | 3/1973 | Cuorato et al. | 52/67 |
| 3,748,793 | 7/1973 | Tompkins et al. | 52/64 |
| 3,869,841 | 3/1975 | Wahlquist | 52/64 |
| 4,271,644 | 6/1981 | Rilliet | 52/67 |

FOREIGN PATENT DOCUMENTS 518966  2/1931  Fed. Rep. of Germany ......... 52/67

*Primary Examiner*—William F. Pate, III
*Assistant Examiner*—Caroline D. Dennison
*Attorney, Agent, or Firm*—Cahill, Sutton & Thomas

[57] ABSTRACT

An animal housing system, for example, a horse barn, is constructed to permit ready access by a vehicle for purposes of cleansing the interior of the structure and removal and replacement of the bedding and supporting surfaces. The housing system is structured to incorporate exterior and internal walls arranged to form individual stalls; the interior walls, and at least a portion of the exterior walls, are arranged to be movable to alternate positions to provide an unobstructed passage extending the length or breadth of the entire structure to permit a vehicle to pass therethrough.

8 Claims, 12 Drawing Figures

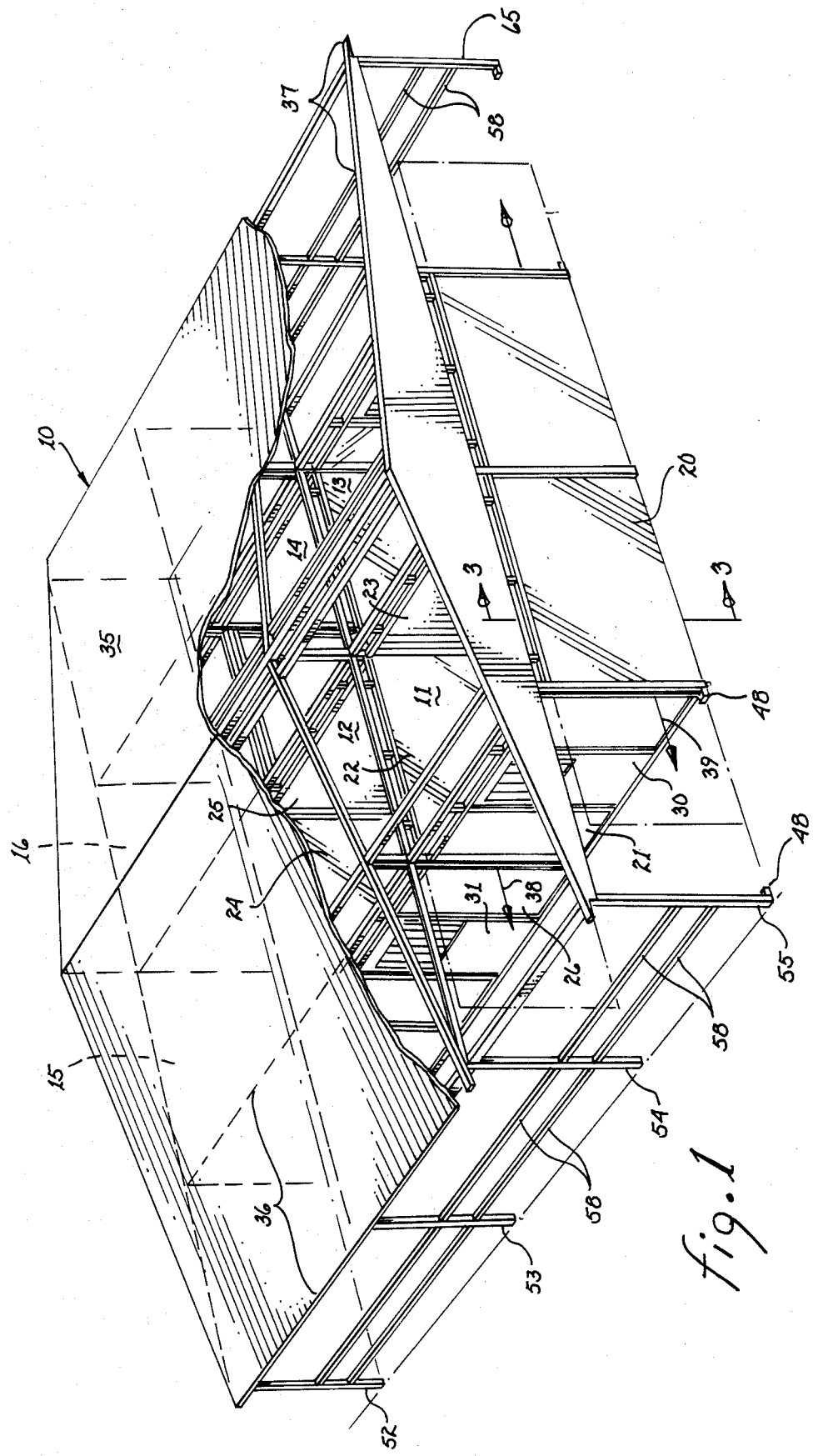

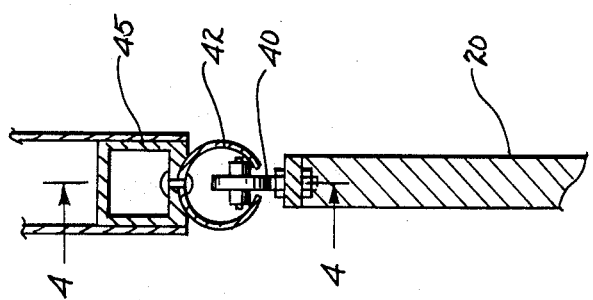
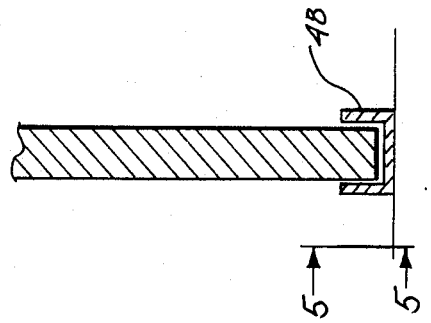
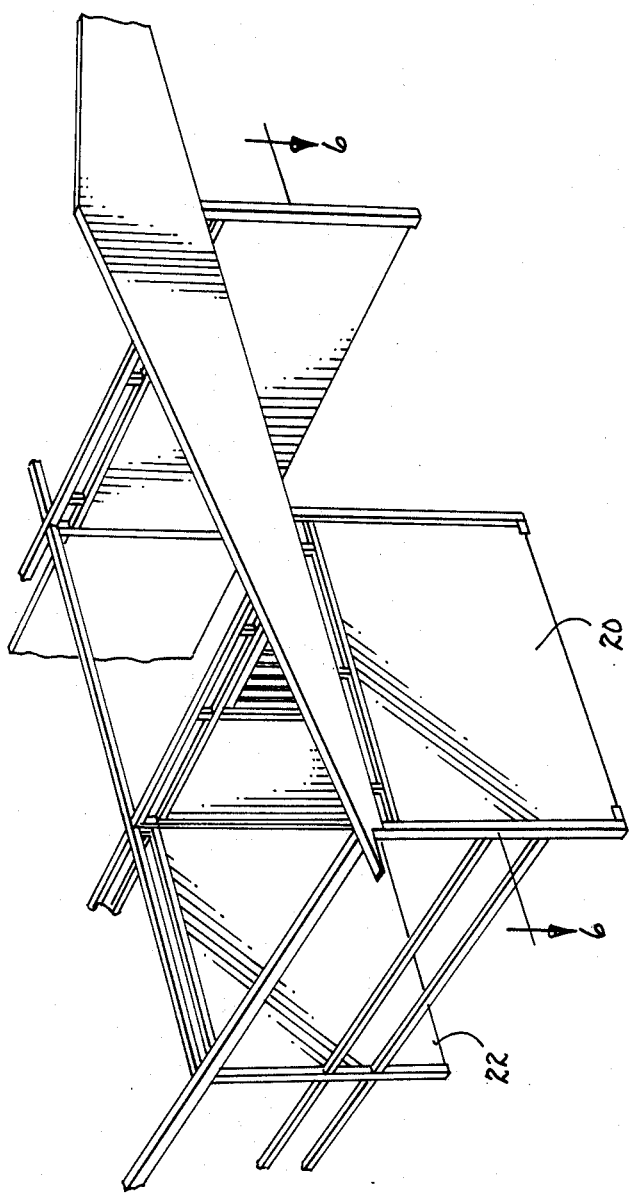
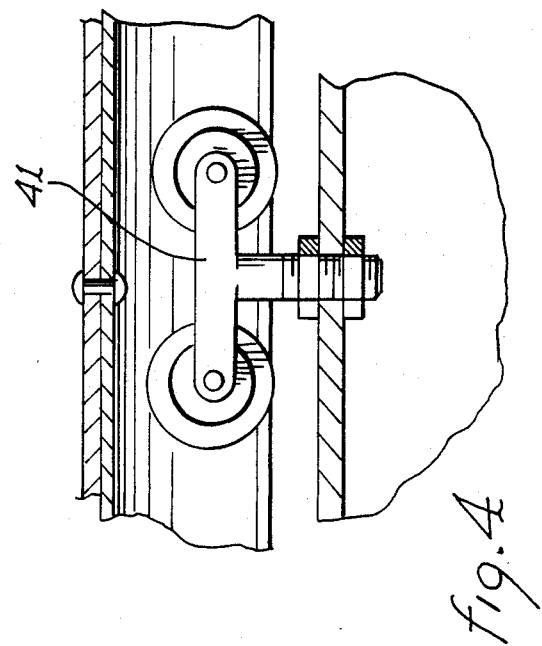
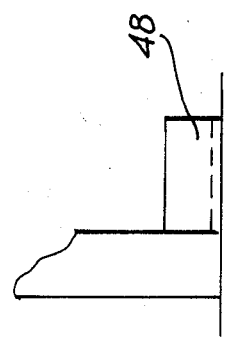

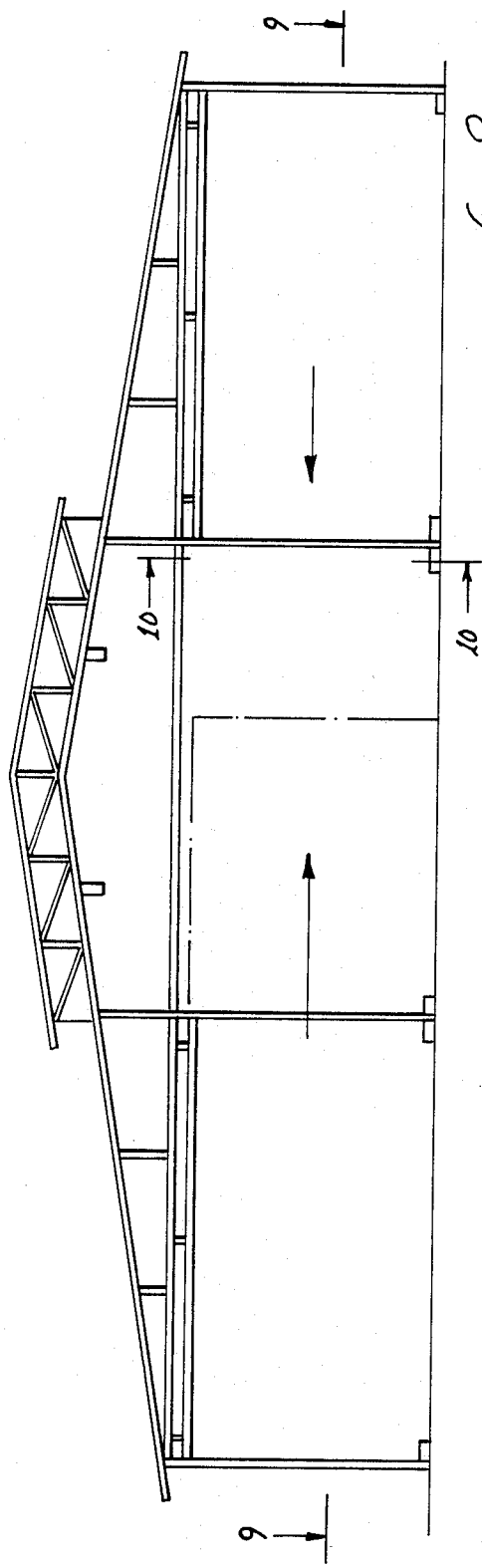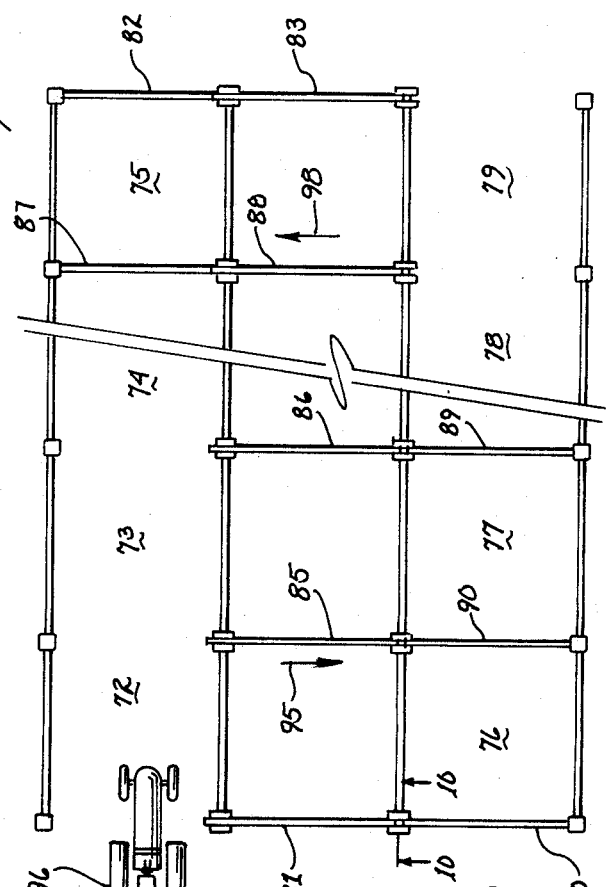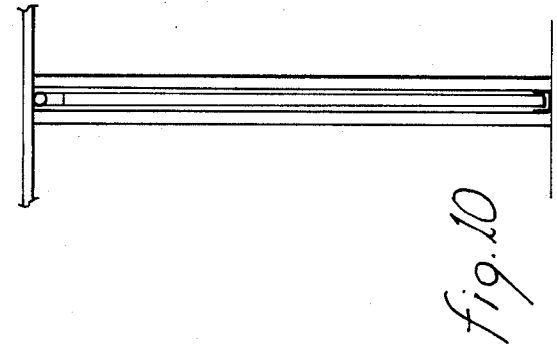

ANIMAL HOUSING SYSTEM

BACKGROUND OF THE INVENTION

The present invention pertains to animal housing systems, and more particularly, to a housing structure incorporating movable walls to permit access through the structure for purposes of cleaning.

In animal housing systems, and most particularly with respect to horse barns, it is common for the barn to be partitioned into individual stalls. Each of the stalls, housing an individual animal or horse, must be cleaned on a daily basis. Such cleaning typically takes the form of manually entering the stall and removing the waste and/or bedding to place the stall in proper condition for the continued habitation for the horse. In large barns, and particularly of the type found at racing facilities, it is common for the individual horse owners to take care of the cleaning of the stalls on a daily basis; however, periodically, and particularly when a race meet is finished (usually several weeks) it becomes the job of the racing organization to thoroughly clean all of the stalls. In most instances, although not always, the horses have been removed from the race grounds. This second type of cleaning must be considerably more thorough than the daily cleanings.

This "thorough" cleaning necessitates the removal of the "bedding" and possibly of the underlying soil. Further, the walls and partitions are usually cleaned and disinfected to prevent the spread of any communicable diseases when the next race meet occurs and new horses enter the stalls. The time consumed in such cleanup operations is considerable. Attempts have been made in the prior art to automate waste disposal in such barns; however, the meticulous and thorough cleaning necessitated on a periodic basis (other than daily) nevertheless requires substantial manual labor with its attendant high cost. Prior art animal housing structures have frequently incorporated movable walls or partitions that have permitted the restructuring of the interior of the building for a variety of purposes. It is not uncommon to have interior walls movable to provide larger or smaller individual stalls or to provide a means for isolating a portion of the structure for a particular purpose such as the isolation of individual animals. None of the prior art animal housing systems provide a system wherein all of the stalls may conveniently be cleaned through the utilization of vehicular equipment by providing a passageway entirely through the stalls and the exterior walls of the structure.

OBJECTS OF THE INVENTION

It is therefore an object of the present invention to provide an animal housing system incorporating a means for admitting a vehicle for cleaning the interior of the structure.

It is another object of the present invention to provide an animal housing system incorporating a plurality of stalls wherein each of the stalls is separated by interior walls and wherein each of the walls is positionable to an alternate position out of the way of a vehicle, such as a tractor, to gain entry to all of the stalls.

It is still another object of the present invention to provide an animal housing system wherein a structure is provided with a plurality of interior walls to divide the interior of the structure into a plurality of individual stalls; the individual stalls are made accessible to a vehicle such as a tractor by moving each of the interior walls, together with at least portions of the exterior wall, to provide an unobstructed passageway for such vehicle entirely through the structure.

These and other objects of the present invention will become apparent to those skilled in the art as the description thereof proceeds.

SUMMARY OF THE INVENTION

Briefly, in accordance with one embodiment chosen for illustration, an animal housing system such as a horse barn is divided into a plurality of individual stalls. The stalls are formed by the intersection of interior and exterior walls and may be arranged to permit access to the stalls through doorways to the interior and/or the exterior of the building. Selected interior walls, together with selected portions of the exterior walls, are mounted in raceways to permit the respective walls to be moved, longitudinally, along their own planes to alternate positions. The interior walls are movable on tracks or rails that extend through the exterior wall thus permitting each of the interior walls to be moved to its alternate position on the exterior of the building. Similarly, at least portions of the exterior wall are mounted for movement on rails such that the placement of all of the walls, both interior and exterior, in their alternate positions provides an unobstructed passageway through all of the stalls for the admission of a vehicle such as a tractor.

The tractor with scraper, or other implement, may than pass unobstructed through the entire building to clean all of the stalls and perform what other disinfecting or cleaning operations as may be necessary. The bedding, and supporting soil, may be replaced by simply spreading same from a vehicle during its passage through the barn. When the appropriate bedding and supporting soil has been replaced, the walls may then be replaced in their original positions to again form individual stalls positioned within the interior of the structure.

BRIEF DESCRIPTION OF THE DRAWINGS

The present invention may more readily be described by reference to the accompanying drawings in which:

FIG. 1 is a perspective view, partly broken away, of an animal housing structure constructed in accordance with the teachings of the present invention.

FIG. 2 is a perspective view of a portion of the structure of FIG. 1 showing certain walls placed in their alternate positions.

FIG. 3 is a cross-sectional view of a portion of FIG. 1 taken along lines 3—3.

FIG. 4 is a cross-sectional view of FIG. 3 taken along lines 4—4.

FIG. 5 is a side elevational view of a corner of the structure shown in FIGS. 1 and 2.

FIG. 8 is a front view of the animal housing structure of FIG. 7.

FIG. 9 is a top view of the animal housing structure of FIG. 7 with the roof removed, and showing the walls being placed in their alternate positions.

FIG. 10 is a cross-sectional view of a portion of FIG. 9 taken along lines 10—10.

DETAILED DESCRIPTION OF THE PREFERRED EMBODIMENTS

Figure 6:
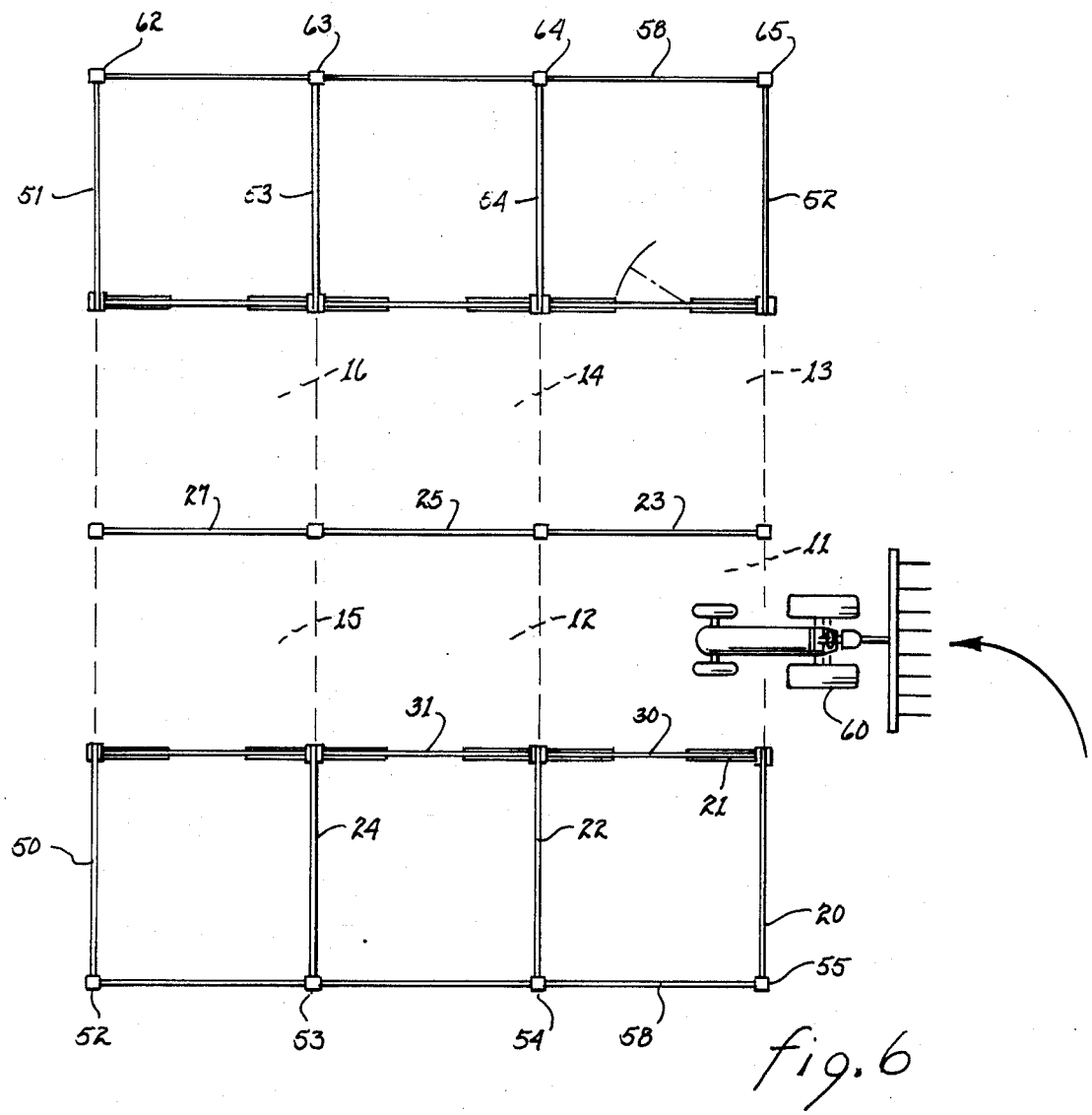
FIG. 6 is a top view, with the roof structure removed, of the structure of FIG. 1 showing the walls removed to their alternate positions.

Referring now to FIGS. 1 through 6, an animal housing system 10 in the form of a horse barn is shown. For purposes of illustration, the horse barn is shown incorporating six stalls 11 through 16; however, it will be apparent that any number of stalls may be incorporated in the barn. As a practical matter, in larger installations such as race tracks, it is not uncommon to have 40 or more stalls in a single barn. The individual stalls 11 through 16 are defined by a combination of interior and exterior walls. For example, stall 11 is formed by exterior walls 20 and 21, and interior walls 22 and 23. The adjacent stall 12, is formed by interior walls 22, 24 and 25, and exterior wall 26.

In the particular multi-stall structure shown in FIG. 1, access may be gained to each of the individual stalls through doors, such as those shown at 30 and 31 and which provide communication from the interior of the respective stalls to the exterior of the building.

In the embodiment shown in FIGS. 1 through 6, the structure is covered by a roof system 35 that incorporates overhangs 36 and 37 extending along either side of the barn. The depth of each overhang is chosen to substantially equal the depth of the individual stalls. For example, a typical size for an individual stall is twelve feet long by twelve feed wide. Accordingly, the overhangs 36 and 37 may be chosen to be twelve feet for purposes that will become apparent as the description proceeds.

Selected interior walls, and exterior portions, are mounted for movement to alternate positions. For example, interior wall 22 is mounted for movement along its own plane in a direction shown by the arrow 38 to an alternate position such as that shown in FIG. 2. Similarly, the exterior wall portion 20 is mounted for movement in its plane in the direction indicated by the arrow 39 so that it may be positioned in an alternate position such as that shown in FIG. 2. Similarly, interior wall 24 may be moved along its plane to an alternate position.

The movement of the respective walls to alternate positions may be facilitated by any convenient mounting means such as that shown in FIGS. 3, 4 and 5. Referring to those figures, it may be seen that the individual walls, such as wall 20 is supported by bolts 40 secured to a trolley mounted within a tubular track 42 such that the wall 20 may be moved along the track 42. The track 42, in turn, is supported to a structural member 45 of the barn structure. The wall 20 is guided by a guide rail 48 which may be conveniently formed by a conventional U-shaped channel. It may not be necessary for the guide rail 48 to extend the entire length of the wall panel; for example, it may only be necessary for the guide rails to exist at the corners of the respective walls since the wall need only be secured against impact and movement perpendicular to the respective faces thereof when the walls are in place; it is assumed that the animals will have been removed from the stalls during movement of the walls.

In the embodiment chosen for illustration in FIGS. 1 through 6, the overhangs 36 and 37 are supported at the exterior thereof by a plurality of vertical posts such as those shown at 52, 53, 54 and 55. Horizontal rails 58 are positioned between the respective posts for reasons that will become apparent as the description proceeds.

Referring specifically to FIG. 6, the exterior wall 20, as well as the interior walls 22 and 24 have been moved to their alternate positions. Similarly, exterior walls 50, 51 and 52 have each been moved to their alternate positions while interior walls 53 and 54 have also been moved to their respective alternate positions. The interior walls 23, 25 and 27 remain in their original positions. It may therefore be seen that the stalls (shown in FIG. 6 in broken lines) 11 through 16 have now been completely opened to provide an unobstructed passageway throughout the entire length of the barn by a suitable vehicle such as a tractor 60 to permit comprehensive scraping, scooping, dragging, and disinfecting of the individual stalls; further new bedding and bedding foundation may be laid using similar vehicular techniques without the time consuming efforts of manually replacing such materials.

When the cleaning operation is complete, each of the interior walls 22, 24, 53 and 54 as well as the exterior walls 20, 50, 51 and 52 may then be moved to their original positions to again form the respective stalls.

In the event that animals are still present at the time that such cleaning is required, the animal housing system of the present invention provides a convenient temporary stall adjacent each of the regular stalls for temporarily housing the animal during the cleaning operation. The overhangs 36 and 37 extend out to the vertical posts 52 through 55 and 62 through 65. Each of the movable walls, both interior and exterior, are positionable to their alternate position located adjacent a respective one of the vertical posts. When the movable walls are thus placed, it may be seen by reference to FIG. 6 that the walls, in combination with the rails 58 extending between the vertical posts form temporary stalls. Further, the respective temporary stalls communicate with their respective adjacent permanent stalls through convenient doors such as those shown at 30 and 31. Thus, referring to stall 11 as an example, the animal housed in that particular stall may either be held or temporarily removed from the barn while the exterior wall 20 and interior wall 22 are moved to their alternate positions. The animal may then be placed in the temporary stall 61 formed by the walls 20 and 22 (in their alternate positions). When the cleaning operation is complete, the walls 20 and 22 are replaced in their original positions and the animal may again occupy the original stall.

Figure 7:
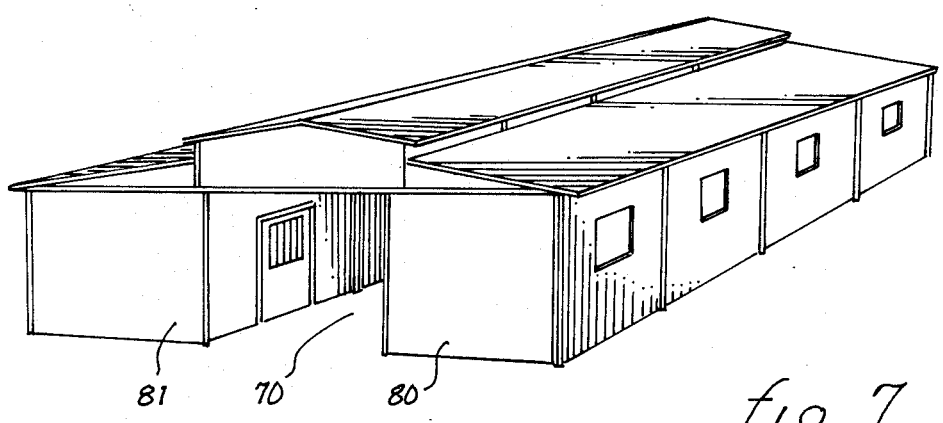
FIG. 7 ia a perspective view of a different type of animal housing structure known as a breezeway barn, also incorporating the teachings of the present invention.

In the embodiment chosen for illustration in FIGS. 1 through 6, access to the individual stalls is from the outside of the barn while the roof structure of the barn incorporates substantial overhangs along each side thereof. In the embodiment shown in FIGS. 7 through 10, the structure of the present invention is incorporated in a different type of barn commonly referred to as a "breezeway barn". Referring to FIGS. 7 through 10, a raised breezeway 70 permits access to each of a plurality of stalls 72 through 79 from the breezeway. It may be noted that the roof over the breezeway may be elevated as shown in FIG. 7 (providing greater ventilation in warmer climates) while the overhangs of the previously described embodiment have been eliminated. It will be apparent to those skilled in the art that any combination of the embodiments shown in FIGS. 1 and 7 may be used and that overhangs or breezeways may be incorporated in the system of the present invention. In the embodiment shown in FIGS. 7 through 10, the exterior walls 80, 81, 82 and 83, as well as the interior walls 85 through 90, may be moved to their alternate positions wherein the moved walls extend into the breezeway 70. In FIG. 9, the interior and exterior walls have been moved as indicated by the arrow 95 to clear an unobstructed passageway for the tractor 96. As an illustration of the clearing of the stalls on the opposite side of the barn, the floor plan of FIG. 9 is shown divided such that the right hand stalls are shown with the interior and exterior walls moved in the direction of the arrow 98 to clear an unobstructed passageway for a tractor along the bottom row of stalls. Thus for example, the exterior wall 80 or exterior wall 81 may be moved into the breezeway 70 to expose a passageway through all of the stalls along that respective side of the barn.

Figure 11:
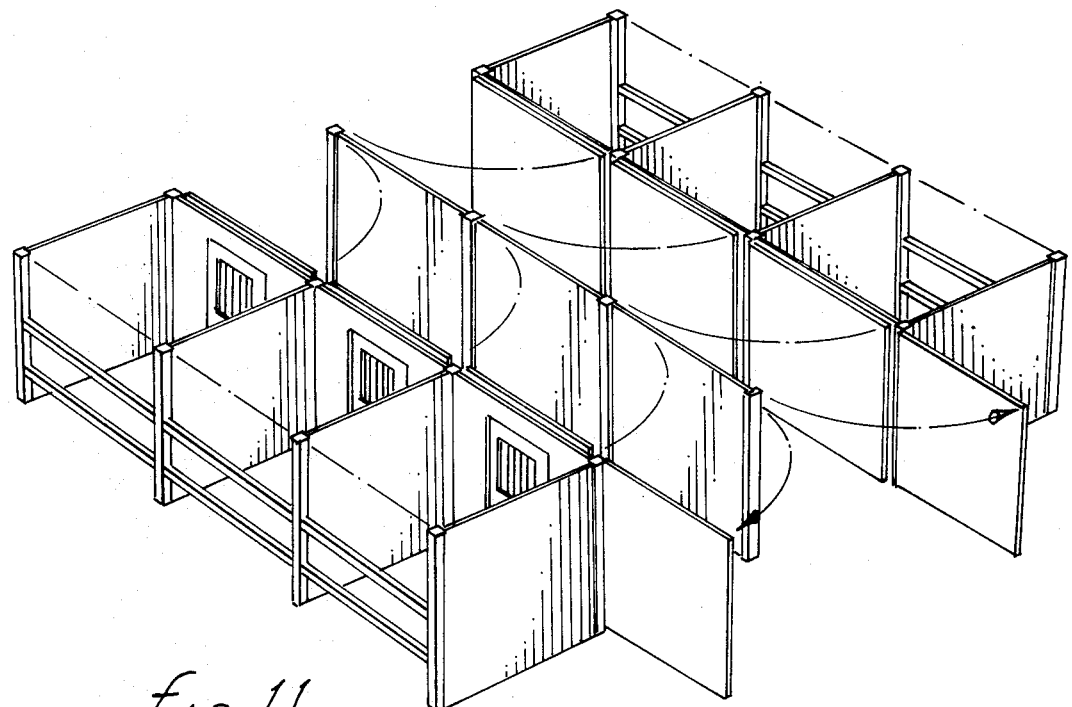
FIG. 11 is a perspective view, with roof removed, of an alternate embodiment of an animal housing system constructed in accordance with the teachings of the present invention.
Figure 12:
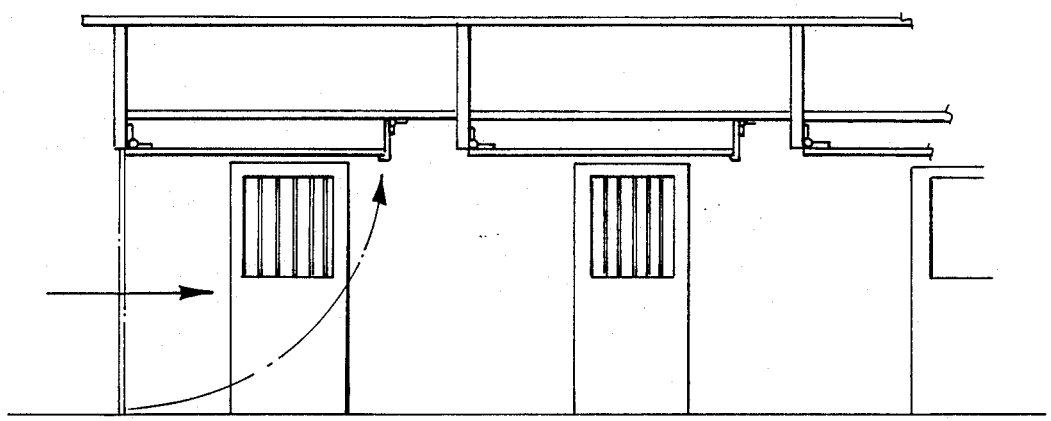
FIG. 12 is a front elevational view of another embodiment of a housing structure incorporating the teachings of the present invention.

Any convenient means may be used to provide movement of the respective walls from their primary to their alternate positions. The use of an overhead rail system such as that described above in connection with FIGS. 3 through 5 may conveniently be replaced by hinged systems such as shown in FIGS. 11 and 12. Referring to FIG. 11, the walls are each mounted on vertical hinges to permit each of the walls to be pivoted horizontally from its normal or primary position to its alternate position. Similarly, the walls may be mounted on horizontal hinges such as shown in FIG. 12 to permit each of the walls to be pivoted vertically. It is also possible to use roll-up type walls in selected applications, or to combine the various types of wall moving techniques in a single barn. In each of the above-described techniques for moving the respective walls, it is important to note that both interior as well as exterior walls should be movable to provide an unobstructed passageway throughout the entire length of the barn to facilitate use of vehicular implements.

We claim:

1. An animal housing system comprising:
   (a) a barn structure having a exterior and interior walls, said walls arranged to form a plurality of animal stalls in said barn structure;
   (b) selected ones of said interior walls, and selected ones of said exterior walls being moveable and mounted for movement to alternate positions;
   (c) each of said animal stalls formed having a pair of said moveable walls positioned on opposite sides thereof, each of said moveable walls, when in position forming a stall, extending from one corner of said stall to another corner of said stall; and
   (d) an unobstructed vehicle passageway formed by said stalls when said moveable walls are in said alternate positions, said passageway extending through said stalls from an exterior of said barn on one side of said barn through said stalls to the exterior of said barn on the opposite side of said barn.

2. The combination set forth in claim 1 wherein said interior walls are hung on carriages mounted on overhead tracks to permit said walls to be moved along the plane of the walls to said alternate positions.

3. The combination set forth in claim 1 wherein said interior walls are hinged along a horizontal top edge thereof to permit said walls to be pivoted upwardly and raised to said alternate positions.

4. The combination set forth in claim 1 wherein said interior walls are hinged along a vertical edge thereof to permit said walls to be pivoted horizontally to said alternate positions.

5. An animal housing system comprising:
   (a) a barn structure having exterior and interior walls, said walls arranged to form a plurality of animal stalls in said barn structure;
   (b) selected ones of said interior walls, and selected ones of said exterior walls being moveable and mounted for movement to alternate positions;
   (c) each of said animal stalls formed having a pair of said moveable walls positioned on opposite sides thereof, each of said moveable walls, when in position forming a stall, extending from one corner of said stall to another corner of said stall;
   (d) an unobstructed vehicle passageway formed by said stalls when said moveable walls are in said alternate positions, said passageway extending through said stalls form an exterior of said barn on one side of said barn through said stalls to the exterior of said barn on the opposite side of said barn;
   (e) said barn structure including a roof with an overhang extending over and outside of one of said exterior walls;
   (f) each of said movable interior walls, when in said alternate position, extending from said one exterior wall; and
   (g) means defining rails extending parallel to said one exterior wall to form exterior stalls bounded by said exterior wall, said alternately positioned interior walls, and said rails.

6. The combination set forth in claim 5 wherein said interior walls are hung on carriages mounted on overhead tracks to permit said wall to be moved along the plane of the wall to said alternate position.

7. An animal housing system comprising:
   (a) a barn structure having exterior and interior walls, said walls arranged to form a plurality of animal stalls in said barn structure;
   (b) selected ones of said interior walls, and selected ones of said exterior walls being moveable and mounted for movement to alternate positions:
   (c) each of said animal stalls formed having a pair of said moveable walls positioned on opposite sides thereof, each of said moveable walls, when in position forming a stall, extending from one corner of said stall to another corner of said stall;
   (d) an unobstructed vehicle passageway formed by said stalls when said moveable walls are in said alternate positions, said passageway extending through said stalls from an exterior of said barn on one side of said barn through said stalls to the exterior of said barn on the opposite side of said barn;
   (e) said barn structure including a breezeway extending the length of the barn adjacent a pair of said interior walls; and
   (f) each of said movable interior walls, and portions of said exterior walls, when in said alternate positions, extending across said breezeway.

8. An animal housing system comprising:
   (a) a barn structure having exterior and interior walls, said walls arranged to form a plurality of animal stalls in said barn structure;

(b) selected ones of said interior walls, and selected ones of said exterior walls being moveable and mounted for movement to alternate positions;

(c) each of said animal stalls formed having a pair of said moveable walls positioned on opposite sides thereof, each of said moveable walls, when in position forming a stall, extending from one corner of said stall to another corner of said stall;

(d) an unobstructed vehicle passageway formed by said stalls when said moveable walls are in said alternate positions, said passageway extending through said stalls form an exterior of said barn on one side of said barn through said stalls to the exterior of said barn on the opposite side of said barn;

(e) said barn structure including a roof with an overhang extending over and outside of one of said exterior walls, said overhang being supported by spaced vertical posts positioned along a line parallel to said exterior wall;

(f) each of said movable interior walls, when in said alternate position, extending from said one exterior wall to a different one of said vertical posts; and (g) means defining rails extending between said posts parallel to said one exterior wall to form exterior stalls bounded by said exterior wall, said alternately positioned interior walls, and said rails.

* * * * *